United States Patent
Noda et al.

(10) Patent No.: US 10,868,453 B2
(45) Date of Patent: Dec. 15, 2020

(54) ROTOR OF ROTATING ELECTRIC MACHINE

(71) Applicants: TOYOTA JIDOSHA KABUSHIKI KAISHA, Toyota (JP); AISIN AW CO., LTD., Anjo (JP)

(72) Inventors: Ken Noda, Nagoya (JP); Shinya Sano, Toyota (JP); Hiroyuki Hattori, Okazaki (JP); Masayuki Ikemoto, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/276,750

(22) Filed: Feb. 15, 2019

(65) Prior Publication Data

US 2019/0260248 A1 Aug. 22, 2019

(30) Foreign Application Priority Data

Feb. 19, 2018 (JP) .................................. 2018-027231

(51) Int. Cl.
*H02K 1/32* (2006.01)
*H02K 1/27* (2006.01)
(Continued)

(52) U.S. Cl.
CPC .............. *H02K 1/32* (2013.01); *H02K 1/276* (2013.01); *H02K 1/2766* (2013.01); *H02K 7/003* (2013.01); *H02K 9/19* (2013.01)

(58) Field of Classification Search
CPC ........ H02K 1/32; H02K 1/276; H02K 1/2766; H02K 5/20; H02K 9/19; H02K 7/003
(Continued)

(56) References Cited

U.S. PATENT DOCUMENTS

| 3,241,331 A | * | 3/1966 | Endress | ................ F25B 31/008 62/117 |
| 3,684,906 A | * | 8/1972 | Lenz | ........................ H02K 1/32 310/61 |

(Continued)

FOREIGN PATENT DOCUMENTS

| CN | 105009421 A | 10/2015 |
| JP | 4664737 | 4/2011 |

(Continued)

*Primary Examiner* — Thanh Lam
(74) *Attorney, Agent, or Firm* — Oblon, McClelland, Maier & Neustadt, L.L.P.

(57) ABSTRACT

The rotor of the rotating electric machine includes the rotor shaft and the rotor core. The rotor shaft has the shaft refrigerant passage and the refrigerant supplying port on the outer peripheral surface of the rotor shaft, the shaft refrigerant passage extending in an axial direction, the refrigerant supplying port communicating with the shaft refrigerant passage. The rotor core has the rotor core refrigerant passage and the refrigerant receiving port on the inner peripheral surface of the rotor core, the rotor core refrigerant passage extending in the axial direction, the refrigerant receiving port communicating with the rotor core refrigerant passage and facing the refrigerant supplying port of the rotor shaft. A clearance groove part is provided at a portion that is on the inner peripheral surface of the rotor core and that faces the refrigerant supplying port of the rotor shaft, the clearance groove part extending in the axial direction.

2 Claims, 4 Drawing Sheets

(51) Int. Cl.
*H02K 9/19* (2006.01)
*H02K 7/00* (2006.01)

(58) Field of Classification Search
USPC .......................... 310/52, 54, 57, 59, 60 A, 61
See application file for complete search history.

(56) References Cited

U.S. PATENT DOCUMENTS

| | | | |
|---|---|---|---|
| 6,515,383 B1* | 2/2003 | Ognibene | H02K 9/20 |
| | | | 310/52 |
| 9,985,500 B2* | 5/2018 | Rippel | H02K 9/19 |
| 2013/0221772 A1* | 8/2013 | Miyamoto | H02K 9/19 |
| | | | 310/54 |
| 2016/0036276 A1 | 2/2016 | Yamagishi et al. | |
| 2016/0372983 A1 | 12/2016 | Okochi | |
| 2017/0012503 A1 | 1/2017 | Okochi | |
| 2017/0163110 A1 | 6/2017 | Hattori | |
| 2017/0310179 A1 | 10/2017 | Okouchi et al. | |
| 2018/0205294 A1* | 7/2018 | Manabe | H02K 9/19 |

FOREIGN PATENT DOCUMENTS

| | | |
|---|---|---|
| JP | 4816522 | 11/2011 |
| JP | 2013-55775 A | 3/2013 |
| JP | 2014-176235 | 9/2014 |
| JP | 2015-104176 | 6/2015 |
| JP | 5913160 | 4/2016 |
| JP | 6098578 | 3/2017 |
| JP | 6194926 | 9/2017 |
| JP | 6269436 | 1/2018 |
| JP | 6269600 | 1/2018 |
| JP | 6398908 | 10/2018 |

\* cited by examiner

ROTOR OF ROTATING ELECTRIC MACHINE

CROSS REFERENCE TO RELATED APPLICATION

This application claims priority to Japanese Patent Application No. 2018-027231 filed on Feb. 19, 2018, which is incorporated herein by reference in its entirety including the specification, claims, drawings, and abstract.

TECHNICAL FIELD

The present disclosure generally relates to a rotor of a rotating electric machine, and more particularly to a rotor of a rotating electric machine that is formed by pressing a rotor shaft into a rotor core.

BACKGROUND

A rotating electric machine generates heat with operation, and influences characteristics of a permanent magnet provided in the rotor. Therefore, it is necessary to cool the rotor.

JP 2014-176235 A discloses a rotor of a rotating electric machine that includes: a rotor shaft having a refrigerant passage extending in an axial direction and a refrigerant supplying port extending in a radial direction; and a rotor core having a first refrigerant passage extending in the axial direction and a second refrigerant passage facing the refrigerant supply port of the rotor shaft.

As technology related to the present disclosure, JP 2015-104176 A describes a rotor of a rotating electric machine that includes: a rotor shaft having a key groove on the outer periphery side; and a rotor core having a central hole into which the rotor shaft is inserted and a key part that projects further radially inward from the central hole and that is fitted into the key groove. Here, it is described that the key part has a notch along the radial direction and can thereby relax the stress concentration that can be generated at the base of the key part.

SUMMARY

Technical Problem

In the rotor of the rotating electric machine, when the rotor shaft is pressed into the rotor core, due to the pressing, the inner peripheral surface of the rotor core and the outer peripheral surface of the rotor shaft are scraped, so that chips and the like may be generated. In the case where a refrigerant receiving port is provided on the inner peripheral surface of the rotor core for the cooling of the rotor core and a refrigerant is supplied from the refrigerant supplying port provided on the outer peripheral surface of the rotor shaft, the pressing of the rotor shaft into the rotor core may cause clogging of the refrigerant receiving port with the chips and the like. Hence, there is a demand for a rotor of a rotating electric machine that makes it possible to prevent the clogging of the refrigerant receiving port of the rotor core when the rotor shaft having the outer peripheral surface provided with the refrigerant supplying port communicating with a shaft refrigerant passage is pressed into the rotor core having the inner peripheral surface provided with the refrigerant receiving port communicating with a rotor core refrigerant passage.

Solution to Problem

A rotor of a rotating electric machine according to the present disclosure includes: a rotor shaft having a shaft refrigerant passage and a refrigerant supplying port on an outer peripheral surface of the rotor shaft, the shaft refrigerant passage extending in an axial direction, the refrigerant supplying port communicating with the shaft refrigerant passage; and a rotor core having a rotor core refrigerant passage and a refrigerant receiving port on an inner peripheral surface of the rotor core, the rotor core refrigerant passage extending in the axial direction, the refrigerant receiving port communicating with the rotor core refrigerant passage and facing the refrigerant supplying port of the rotor shaft, in which a clearance groove part is provided at a portion that is on the inner peripheral surface of the rotor core and that faces the refrigerant supplying port of the rotor shaft, the clearance groove part extending in the axial direction.

According to the rotor of the rotating electric machine with the above configuration, a portion of the rotor shaft and a portion of the rotor core that correspond to the clearance groove part are not scraped even if the rotor shaft is pressed into the rotor core. Thereby, the clogging of the refrigerant receiving port of the rotor core is prevented.

BRIEF DESCRIPTION OF DRAWINGS

An embodiment of the present disclosure will be described based on the following figures, wherein.

DESCRIPTION OF EMBODIMENTS

Figure 1:
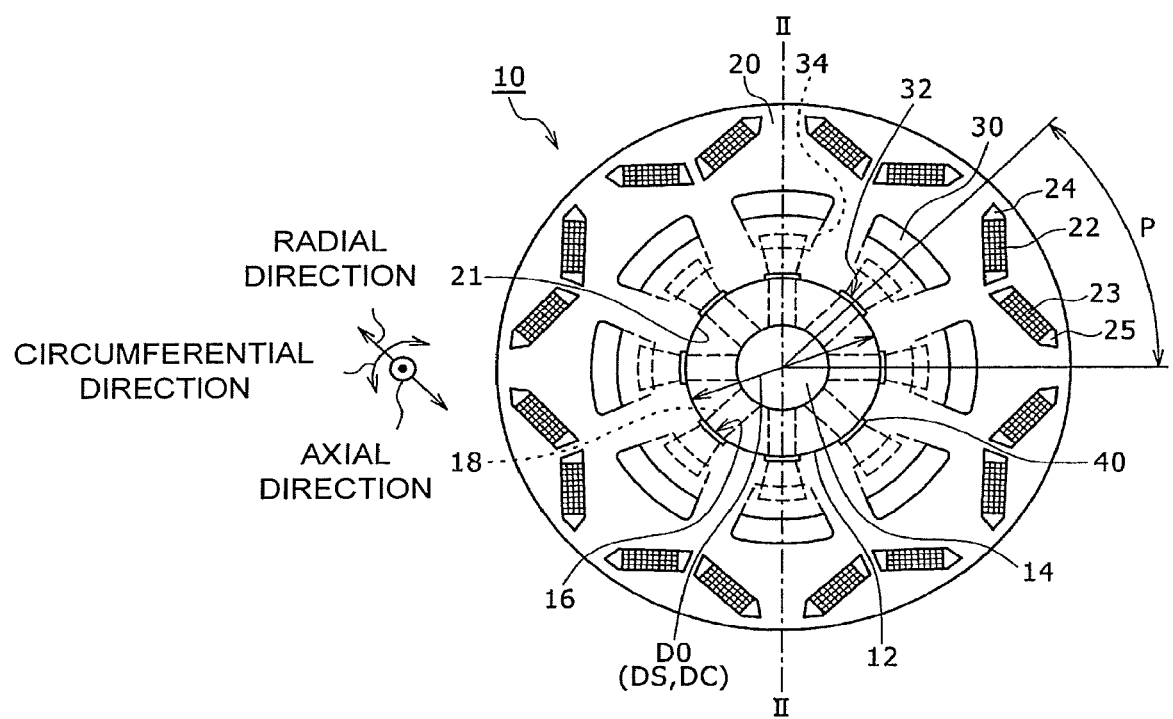
FIG. 1 is a view showing an end surface in an axial direction of a rotor of a rotating electric machine in an embodiment.

Hereinafter, an embodiment will be described in detail with use of the drawings. Dimensions, shapes, materials, the number of magnetic poles of a rotor, the number of refrigerant supplying ports, the number of refrigerant receiving ports, and the like mentioned hereinafter are examples for description, and can be appropriately modified, depending on the specification of a rotor of a rotating electric machine, and the like. Hereinafter, in all drawings, similar elements are denoted by identical reference characters, and repetitive descriptions are omitted.

Figure 2:
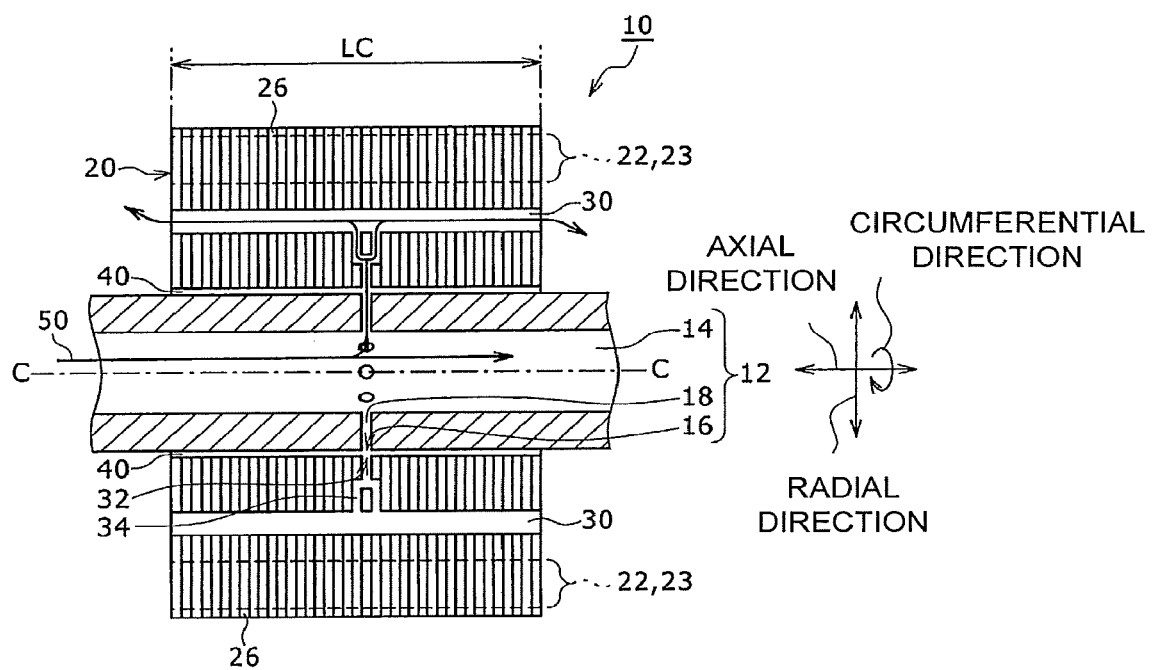
FIG. 2 is a sectional view taken along line II-II in FIG. 1.

FIG. 1 is a view showing an end surface in an axial direction of a rotor 10 of a rotating electric machine that is used in a rotating electric machine mounted on a vehicle. FIG. 2 is a sectional view taken along line II-II in FIG. 1. Hereinafter, unless otherwise noted, the rotor 10 of the rotating electric machine is referred to as the rotor 10. The rotating electric machine using the rotor 10 is a motor generator that functions as an electric motor at the time of powering of the vehicle, and that functions as an electric generator at the time of braking of the vehicle, and is a three-phase synchronous rotating electric machine. The rotating electric machine is constituted by the rotor 10 shown in FIG. 1 and an annular stator that is disposed on the outer periphery side of the rotor 10 at a predetermined space interval and around which a wound coil is wound. In FIG. 1, the illustration of the stator is omitted.

In FIG. 1, an axial direction, a radial direction and a circumferential direction are shown as three axes of the rotor 10. The axis direction is a direction in which a rotation center axis C-C of the rotor 10 extends. The radial direction is a direction extending radially from the rotation center axis C-C to the outer periphery side. The circumferential direction is a direction extending around the rotation center axis C-C.

The rotor 10 includes a rotor shaft 12 and a rotor core 20. The rotor shaft 12 is a rotating shaft of the rotor 10 that is pressed into the rotor core 20 and is fixed, and both ends in the axial direction are supported by a motor case (not illustrated) through unillustrated bearings, in a rotatable manner.

FIG. 1 shows that (the outer diameter of the rotor shaft 12) after the pressing=(the inner diameter of the rotor core 20) after the pressing=D0. When the outer diameter of the rotor shaft 12 before the pressing is referred to as DS and the inner diameter of the rotor core 20 before the pressing is referred to as DC (see FIG. 3), a relation of DS>D0>DC is satisfied.

The rotor shaft 12 has, in the interior, a shaft refrigerant passage 14 extending in the axial direction. On the outer peripheral surface of the rotor shaft 12, there are provided refrigerant supplying ports 16 communicating with the shaft refrigerant passage 14. Shaft-side connection passages 18 are passages that connect the shaft refrigerant passage 14 and the refrigerant supplying ports 16 and that extend in the radial direction. Eight refrigerant supplying ports 16 and eight shaft-side connection passages 18 are provided along the circumferential direction.

The rotor core 20 has a central hole 21 through which the rotor shaft 12 passes. DC is the inner diameter of the central hole 21 before the rotor shaft 12 is pressed in. The rotor core 20 includes permanent magnets 22, 23 that form magnetic poles P of the rotor 10. Each magnetic pole P is constituted by a pair of permanent magnets 22, 23. In the example of FIG. 1, the number of the magnetic poles P is eight. The pair of the permanent magnets 22, 23 of each magnetic pole P are disposed in a roughly V-shape, at a predetermined angle to each other. The roughly V-shape is a disposition shape in which the interval between the pair of the permanent magnets 22, 23 increases toward the outer periphery side. The permanent magnets 22, 23 are thin bar-like magnets each of which has a roughly rectangular section. Each bar length is set to a length that is slightly shorter than a total length LC in the axial direction of the rotor core 20. The permanent magnets 22, 23 are inserted into magnet insertion holes 24, 25, and are fixed by a resin, so as to be buried.

The rotor core 20 has rotor core refrigerant passages 30 extending in the axial direction, at positions that are close to the permanent magnets 22, 23 and that are on the inner diameter side of the permanent magnets 22, 23. The number of the rotor core refrigerant passages 30 is eight, similarly to the number of the magnetic poles P. Each rotor core refrigerant passage 30 is disposed on the border between adjacent magnetic poles P. On the inner periphery surface of the rotor core 20, there are provided refrigerant receiving ports 32 communicating with the rotor core refrigerant passages 30. Core-side connection passages 34 are passages that connect the rotor core refrigerant passages 30 and the refrigerant receiving ports 32 and that extend in the radial direction.

In FIG. 2, the core-side connection passage 34 is connected to the rotor core refrigerant passage 30 side while the single passage on the refrigerant receiving port 32 side is divided into two ways. The two-way-type core-side connection passage 34 in FIG. 2 is an example for description, and the two-way-type does not need to be adopted as long as the core-side connection passage 34 extends from the refrigerant receiving port 32 in the radial direction and is connected to the rotor core refrigerant passage 30. The core-side connection passage 34 may be a single passage extending in the radial direction, and may be a two-way type that is bent in two steps.

The refrigerant receiving ports 32 and the core-side connection passages 34, whose number is eight, similarly to the number of the rotor core refrigerant passage 30, are provided along the circumferential direction, at a central part of the total length LC along the axial direction of the rotor core 20. When the rotor shaft 12 is pressed into the rotor core 20 at a proper position in accordance with the specification, the refrigerant receiving ports 32 of the rotor core 20 face the refrigerant supplying ports 16 of the rotor shaft 12 as shown in FIG. 2. The rotor 10 assembled by the pressing is put in the motor case together with the unillustrated stator, so that the rotating electric machine is obtained.

In FIG. 2, the thick line indicates a flow of a refrigerant 50 in the rotor 10 when the rotating electric machine operates. The refrigerant 50 is fed to the shaft refrigerant passage 14 of the rotor shaft 12 by an unillustrated refrigerant circulating pump or the like, and in the case of FIG. 2, flows from the left side to the right side in the axial direction. When the rotating electric machine operates and the rotor 10 rotates around the rotation center axis C-C, the refrigerant 50 is ejected from the eight refrigerant supplying ports 16 by the centrifugal force. The ejected refrigerant 50 flows through the core-side connection passage 34 along the radial direction, from the facing refrigerant receiving ports 32 of the rotor core 20, enters the rotor core refrigerant passages 30, and flows through the rotor core refrigerant passages 30 along the axial direction. By the refrigerant 50 flowing through the core-side connection passages 34, the permanent magnets 22, 23 are cooled around the center in the axial direction, through the rotor core 20. Furthermore, by the refrigerant 50 flowing through the rotor core refrigerant passages 30 in the axial direction, the permanent magnets 22, 23 are cooled over the total length in the axial direction. The refrigerant 50 flowing through the rotor core refrigerant passage 30 in the axial direction is ejected and returned from both end surfaces in the axial direction of the rotor core 20. For example, the refrigerant 50 is stored at a bottom part of the motor case, and is supplied again to the shaft refrigerant passage 14 of the rotor shaft 12 by the refrigerant circulating pump.

Clearance groove parts 40 shown in FIG. 1 and FIG. 2 are grooves extending in the axial direction, at portions that are on the inner peripheral surface of the rotor core 20 and that face the refrigerant supplying ports 16 of the rotor shaft 12. The clearance groove part 40 is provided on the inner peripheral surface of the rotor core 20, so as to span across the refrigerant receiving port 32, the clearance groove part 40 extending from one end to the other end in the axial direction of the rotor core 20. As shown in FIG. 1, eight clearance groove parts 40 are provided along the circumferential direction of the inner peripheral surface of the rotor core 20, so as to correspond to the positions where the refrigerant receiving ports 32 are provided. A surface that is on the inner peripheral surface of the rotor core 20 and on which the clearance groove parts 40 are not provided is a pressing surface with the rotor shaft 12. The groove depth of the clearance groove part 40 is set to such a depth that the groove bottom does not contact the outer peripheral surface of the rotor shaft 12 even after the rotor shaft 12 is pressed in. The width dimension along the circumferential direction of the clearance groove part 40 can be determined depending on the specification of the holding force due to the pressing of the rotor shaft 12 into the rotor core 20, at least under the condition that the width dimension is larger than the width dimension of the refrigerant receiving port 32 on the inner peripheral surface of the rotor core 20. By providing the clearance groove part 40, the portions of the refrigerant receiving ports 32 of the rotor core 20 do not contact the rotor shaft 12 when the rotor shaft 12 is pressed in.

As the rotor core 20, there is used a laminated body formed by laminating a predetermined number of thin plates 26 composed of a magnetic material. All of the predetermined number of thin plates 26 composed of the magnetic material include the central hole 21 through which the rotor shaft 12 is inserted, the magnet insertion holes 24, 25 for inserting the plurality of permanent magnets 22, 23, the rotor core refrigerant passages 30 and the clearance groove parts 40. All of the thin plates 26 composed of the magnetic material are shaped in a predetermined shape, by the punching of magnetic thin sheets including the central hole 21, the magnet insertion holes 24, 25, the rotor core refrigerant passages 30 and the clearance groove parts 40e. On some of the predetermined number of thin plates 26, which are laminated at the central part of the total length LC in the axial direction of the laminated body, there are shaped holes, slits and the like for forming the two-way-type core-side connection passages 34 along the axial direction. Each of the thin plates 26 is fixed by caulking or the like, while the positions are adjusted such that the central hole 21, the magnet insertion holes 24, 25, the rotor core refrigerant passages 30, the clearance groove parts 40 and the two-way-type core-side connection passages 34 are formed in predetermined shapes, and an annular laminated body is obtained. As the thin plate 26 composed of the magnetic material, an electromagnetic steel sheet can be used.

Figure 3:
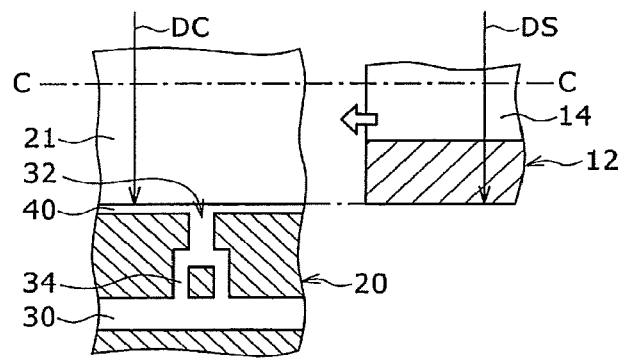
FIG. 3 is a view for describing a functional effect of the rotor of the rotating electric machine in the embodiment, and is a sectional view showing a state before a rotor shaft is pressed into a rotor core.
Figure 4:
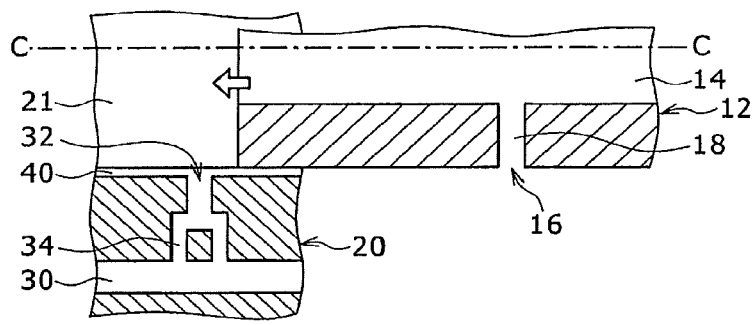
FIG. 4 is a sectional view showing a state where the rotor shaft is being pressed into the rotor core, following FIG. 3.
Figure 5:
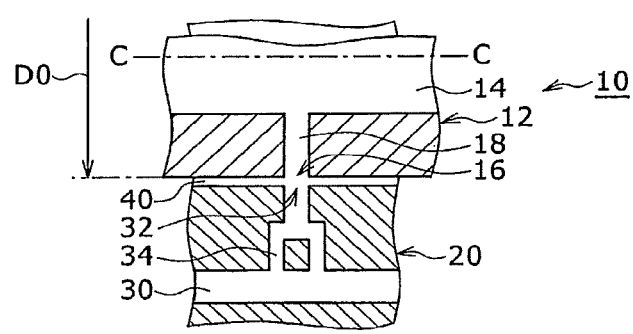
FIG. 5 is a sectional view showing a state after the pressing of the rotor shaft into the rotor core is completed, following FIG. 4.
Figure 6:
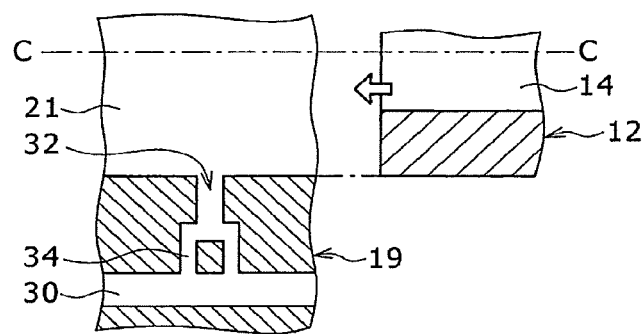
FIG. 6 is a sectional view showing a state before a rotor shaft is pressed into a rotor core in a rotor of a rotating electric machine in the related art that does not include a clearance groove part, as a comparative example.
Figure 7:
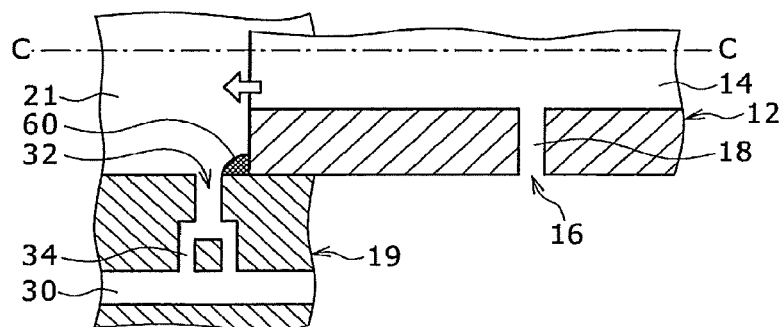
FIG. 7 is a sectional view showing a state where the rotor shaft is being pressed into the rotor core, following FIG. 6.
Figure 8:
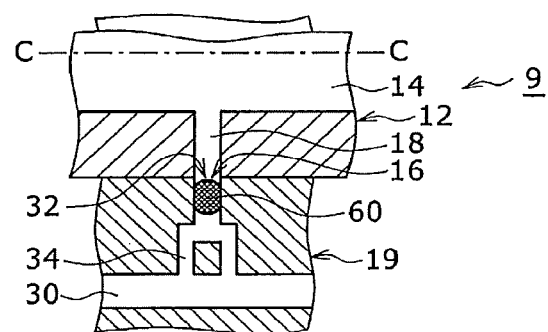
FIG. 8 is a sectional view showing a state after the pressing of the rotor shaft into the rotor core is completed, following FIG. 7.

The functional effect of the above configuration will be described in more detail with use of FIG. 3 to FIG. 8, by comparison with the related art in which the clearance groove part 40 is not included. FIG. 3 to FIG. 5 are views showing a process of a pressing step for the rotor 10 including the clearance groove part 40, and FIG. 6 to FIG. 8 are views showing a process of a pressing step for a rotor 9 not including the clearance groove part 40. The views are enlarged views showing a portion of the lower half part with respect to the line C-C in FIG. 2, particularly, a portion where the refrigerant supplying port 16 and the refrigerant receiving port 32 face each other.

FIG. 3 showing the rotor 10 is a view showing a state before the rotor shaft 12 is pressed into the rotor core 20. The inner diameter of the rotor core 20 is DC in the initial state, and the outer diameter of the rotor shaft 12 is DS in the initial state.

FIG. 4 shows a state where the rotor shaft 12 is being pressed into the rotor core 20 along the direction of the outlined arrow and where a distal end of the rotor shaft 12 has come just short of the refrigerant receiving port 32. At the time of the pressing, because of the clearance groove part 40, the outer peripheral surface of the rotor shaft 12 does not contact the inner peripheral surface in the circumferential direction close to the refrigerant receiving port 32. Even if the outer peripheral surface of the rotor shaft 12 and the inner peripheral surface of the rotor core 20, due to the pressing, are scraped at a portion where the clearance groove part 40 is not provided, the outer peripheral surface of the rotor shaft 12 and the inner peripheral surface of the rotor core 20, due to the pressing, are not scraped at a portion of the clearance groove part 40.

FIG. 5 shows a state where the refrigerant receiving port 32 of the rotor core 20 and the refrigerant supplying port 16 of the rotor shaft 12 are at facing positions after the pressing step is completed. Even if the outer peripheral surface of the rotor shaft 12 and the inner peripheral surface of the rotor core 20, due to the pressing, are scraped at the portion where the clearance groove part 40 is not provided, the refrigerant receiving port 32 is not clogged with the chips and the like.

FIG. 6 showing the rotor 9 is a view corresponding to FIG. 3 showing the rotor 10. The clearance groove part 40 is not provided in a rotor core 19 constituting the rotor 9.

FIG. 7 showing the rotor 9 is a view corresponding to FIG. 4 showing the rotor 10, and shows a state where the rotor shaft 12 is being pressed into the rotor core 19 along the direction of the outlined arrow and where a distal end of the rotor shaft 12 has come just short of the refrigerant receiving port 32. At the time of the pressing, the inner peripheral surface of the rotor core 19 contacts with the outer peripheral surface of the rotor shaft 12 over the whole in the circumferential direction, and the outer peripheral surface of the rotor shaft 12 and the inner peripheral surface of the rotor core 19 are scraped due to the pressing. FIG. 7 shows a state where a chip 60 adheres to a distal end part of the rotor shaft 12.

FIG. 8 showing the rotor 9 is a view corresponding to FIG. 5 showing the rotor 10, and shows a state where the refrigerant receiving port 32 of the rotor core 19 and the refrigerant supplying port 16 of the rotor shaft 12 are at facing positions after the pressing step is completed. The chip 60 caused by the scraping of the outer peripheral surface of the rotor shaft 12 and the inner peripheral surface of the rotor core 19 due to the pressing enters the refrigerant receiving port 32, so that the refrigerant receiving port 32 is clogged with the chip 60. In this state, the refrigerant 50 cannot be supplied to the refrigerant receiving port 32, even if the rotor 9 is put in the motor case together with the unillustrated stator such that the rotating electric machine is obtained, and the refrigerant 50 is supplied to the rotor shaft 12 by the operation of the rotating electric machine and is ejected from the refrigerant supplying port 16 by the rotation of the rotor 9. Accordingly, it is not possible to cool the rotor core 19 and the permanent magnets 22, 23.

According to the rotor 10 of the rotating electric machine with the above configuration, the portion of the rotor shaft 12 and the portion of the rotor core 20 that correspond to the clearance groove part 40 are not scraped even if the rotor shaft 12 is pressed into the rotor core 20. Thereby, the clogging of the refrigerant receiving port 32 of the rotor core 20 is prevented, so that it is possible to cool the rotor core 20 and the permanent magnets 22, 23.

REFERENCE SIGNS LIST

9, 10 rotor, 12 rotor shaft, 14 shaft refrigerant passage, 16 refrigerant supplying port, 18 shaft-side connection passage, 19, 20 rotor core, 21 central hole, 22, 23 permanent magnet, 24, 25 magnet insertion hole, 26 thin plate composed of magnetic material, 30 rotor core refrigerant passage, 32 refrigerant receiving port, 34 core-side connection passage, 40 clearance groove part, 50 refrigerant, 60 chip

The invention claimed is:

1. A rotor of a rotating electric machine comprising:
   a rotor shaft having a shaft refrigerant passage and a refrigerant supplying port on an outer peripheral surface of the rotor shaft, the shaft refrigerant passage extending in an axial direction, the refrigerant supplying port communicating with the shaft refrigerant passage; and
   a rotor core having a rotor core refrigerant passage and a refrigerant receiving port on an inner peripheral surface of the rotor core, the rotor core refrigerant passage extending in the axial direction, the refrigerant receiving port communicating with the rotor core refrigerant passage and facing the refrigerant supplying port of the rotor shaft, wherein
   a clearance groove part is provided at a portion that is on the inner peripheral surface of the rotor core and that faces the refrigerant supplying port of the rotor shaft, the clearance groove part extending in the axial direction.

2. The rotor of the rotating electric machine according to claim 1, wherein the clearance groove part is provided on the inner peripheral surface of the rotor core, so as to span across the refrigerant receiving port, the clearance groove part extending from one end to the other end in the axial direction of the rotor core.

* * * * *